(12) United States Patent
Yen

(10) Patent No.: US 8,091,453 B2
(45) Date of Patent: Jan. 10, 2012

(54) WIRE STRIPPER

(75) Inventor: Chao-Chin Yen, Tucheng (TW)

(73) Assignee: Kauw Yehi Industrial Co., Ltd., Taipei (TW)

( * ) Notice: Subject to any disclaimer, the term of this patent is extended or adjusted under 35 U.S.C. 154(b) by 215 days.

(21) Appl. No.: 12/550,400

(22) Filed: Aug. 30, 2009

(65) Prior Publication Data

US 2011/0048173 A1   Mar. 3, 2011

(51) Int. Cl.
*H02G 1/12* (2006.01)

(52) U.S. Cl. .............................. 81/9.4; 81/9.43

(58) Field of Classification Search ............ 81/9.4–9.44; 30/90.1, 91.2
See application file for complete search history.

(56) References Cited

U.S. PATENT DOCUMENTS

| | | | | |
|---|---|---|---|---|
| 2,765,684 A * | 10/1956 | Reck | ................................ | 81/9.4 |
| 3,707,099 A * | 12/1972 | Petz | ............................... | 81/9.43 |
| 4,395,928 A * | 8/1983 | Undin et al. | ................... | 81/9.43 |
| 6,079,296 A * | 6/2000 | Muromoto | ..................... | 81/9.43 |
| 7,360,472 B2 * | 4/2008 | Krampe et al. | .................. | 81/9.4 |
| 7,870,811 B2 * | 1/2011 | Pracklein et al. | ................ | 81/9.4 |

\* cited by examiner

*Primary Examiner* — Hadi Shakeri

(74) *Attorney, Agent, or Firm* — Chun-Ming Shih; HDLS IPR Services

(57) ABSTRACT

A wire stripper includes: a first main body having a main body portion, a rear grip, a lower engaging portion and an internal accommodating space; a second main body having an outer casing, an inner casing received in the outer casing, two upper engaging portions, two first rail holes located on both sides of the outer casing, two second rails, two first rails located on both sides of the inner casing and two second rail holes; and a third main body having a left casing and a right casing combined with each other, a front grip extending downwards from the left casing and the right casing, an acting portion connected between the second main body and the third main body, and a spring portion abutting in the front grip and the rear grip. The second main body and the third main body are received in the accommodating space.

10 Claims, 7 Drawing Sheets

WIRE STRIPPER

BACKGROUND OF THE INVENTION

1. Field of the Invention

The present invention relates to a wire stripper, and in particular to a wire stripper capable of stripping off insulating surfaces of various wires and easy to operate.

2. Description of Related Art

FIG. 1 shows a conventional wire stripper. A clipping body 4 of the wire stripper includes a left clipper 41 and a right clipper 42 corresponding to each other. The top of the left clipper 41 has a clamping portion 411. A clamping base 412 is provided below the clamping portion 411. The top of the right clipper 2 has a knife 421. A knife base 422 is provided below the knife 421. A positioning portion 423 is provided below the knife base 422. The positioning portion 423 is adjacent to an adjusting portion 424 for adjusting the length of the insulating surface of a wire to-be-stripped. A pivoting portion 43 is pivotally connected between the left clipper 41 and the right clipper 42. Each of the bottom ends of the left clipper 41 and the right clipper 42 is connected to a grip 5.

When the above-mentioned wire stripper intends to receive a wire to-be-stripped into the positioning portion 423, due to the wider clipping body 4, the positioning and stripping of the wire may be hindered if the wire is located in a narrow space. Thus, the environmental space in which the convention wire stripper can be used is restricted.

SUMMARY OF THE INVENTION

The objective of the present invention is to provide a wire stripper, which has a good capability of stripping off a wire, and can be operated easily without being restricted by the environmental space.

The present invention provides a wire stripper, which includes a first main body, a second main body and a third main body. The first main body has a main body portion, a rear grip, a lower engaging portion, and an accommodating space. The rear grip is formed by extending from a rear end of the main body portion. The lower engaging portion is formed by extending from a front end of the main body portion. The accommodating space is located in the first main body.

The second main body includes an outer casing, an inner casing, two upper engaging portions, two first rails, two second rails, two first rail holes and two second rail holes. The inner casing is received in the outer casing. The two upper engaging portions are located at front ends of the inner casing and the outer casing respectively. The two first rail holes are located at front ends on both sides of the outer casing. The two second rails are located at rear ends on both sides of the outer casing. The two first rails are located at the front ends on both sides of the inner casing. The two second rail holes are located at rear ends on both sides of the inner casing.

The third main body includes a left casing, a right casing, an acting portion and a spring portion. The left casing is combined with the right casing. Each of the left casing and the right casing has a front grip. The two front grips are formed by extending downwards from the left casing and the right casing respectively. The acting portion is connected between the second main body and the third main body. The spring abuts within the front grip and the rear grip. The second main body and the third main body are mounted in the accommodating space of the first main body.

In the wire stripper of the present invention, the first rails, the second rails and the acting portion provide a good acting mechanism, whereby the action of stripping off the wire can be operated smoothly with a proper magnitude of force. Thus, the insulating surface of the wire can be stripped off easily, and the integrity of leads within the wire can be protected. The elastic force of the spring portion allows the upper engaging portion to be separated from the lower engaging portion after their engagement, thereby preventing the naked leads from suffering damage. Further, the upper engaging portion and the lower engaging portion can be put into a narrow space to strip off the wire, so that the present invention will not be restricted by an environmental space.

In order to further understand the characteristics and technical contents of the present invention, a description relating thereto will be made with reference to the accompanying drawings. However, the drawings are illustrative only but not used to limit the present invention.

DETAILED DESCRIPTION OF THE PREFERRED EMBODIMENTS

Figure 1:
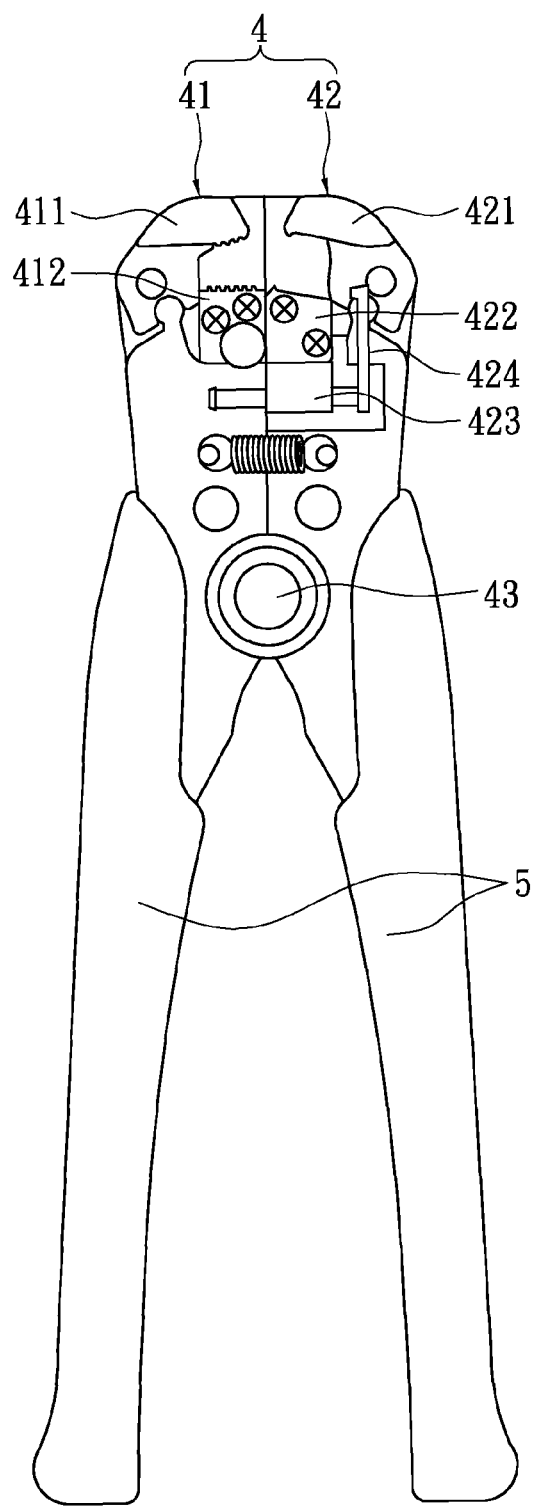
FIG. 1 is a plane view showing the wire stripper in prior art.
Figure 2:
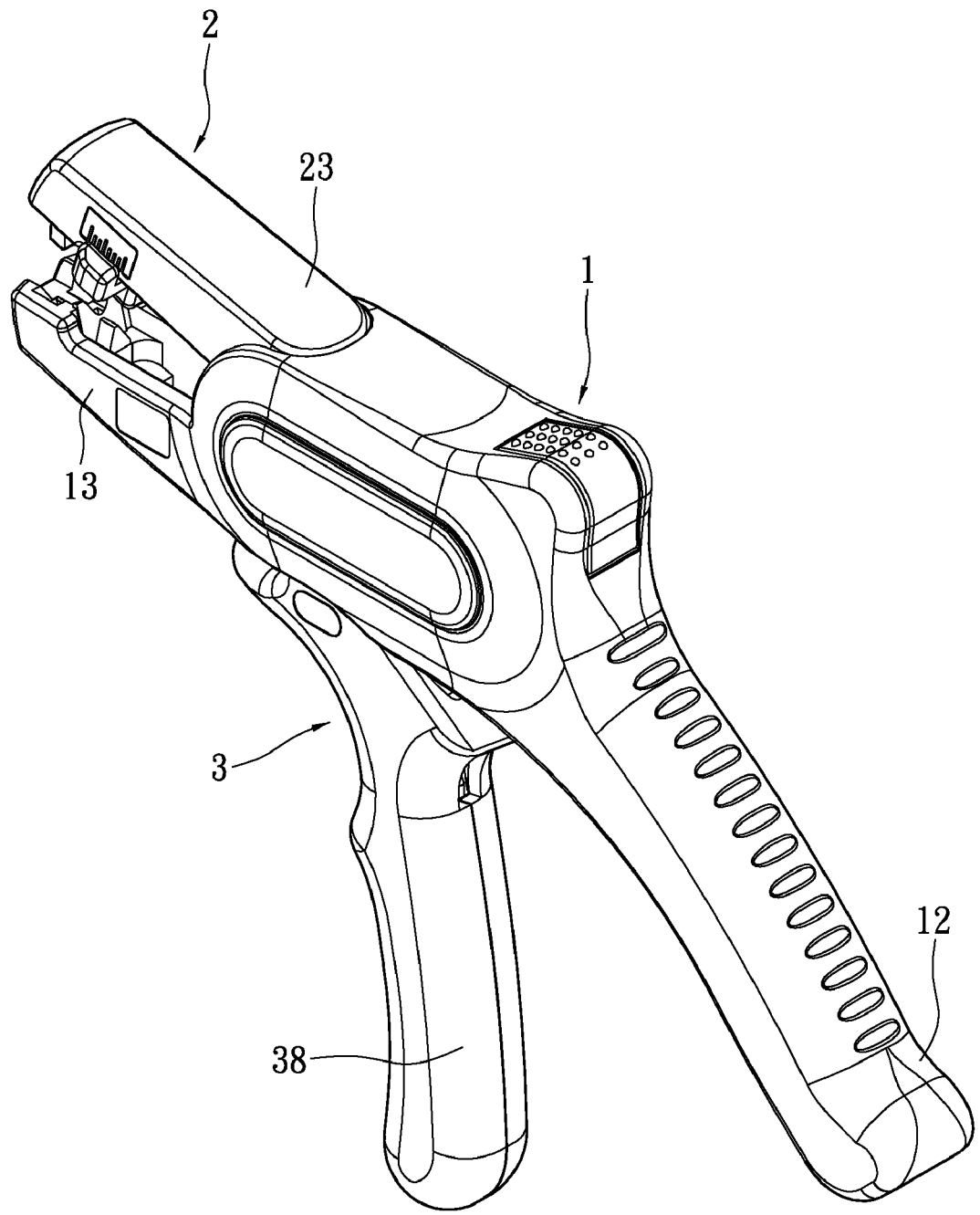
FIG. 2 is a perspective view showing the wire stripper of the present invention.
Figure 3:
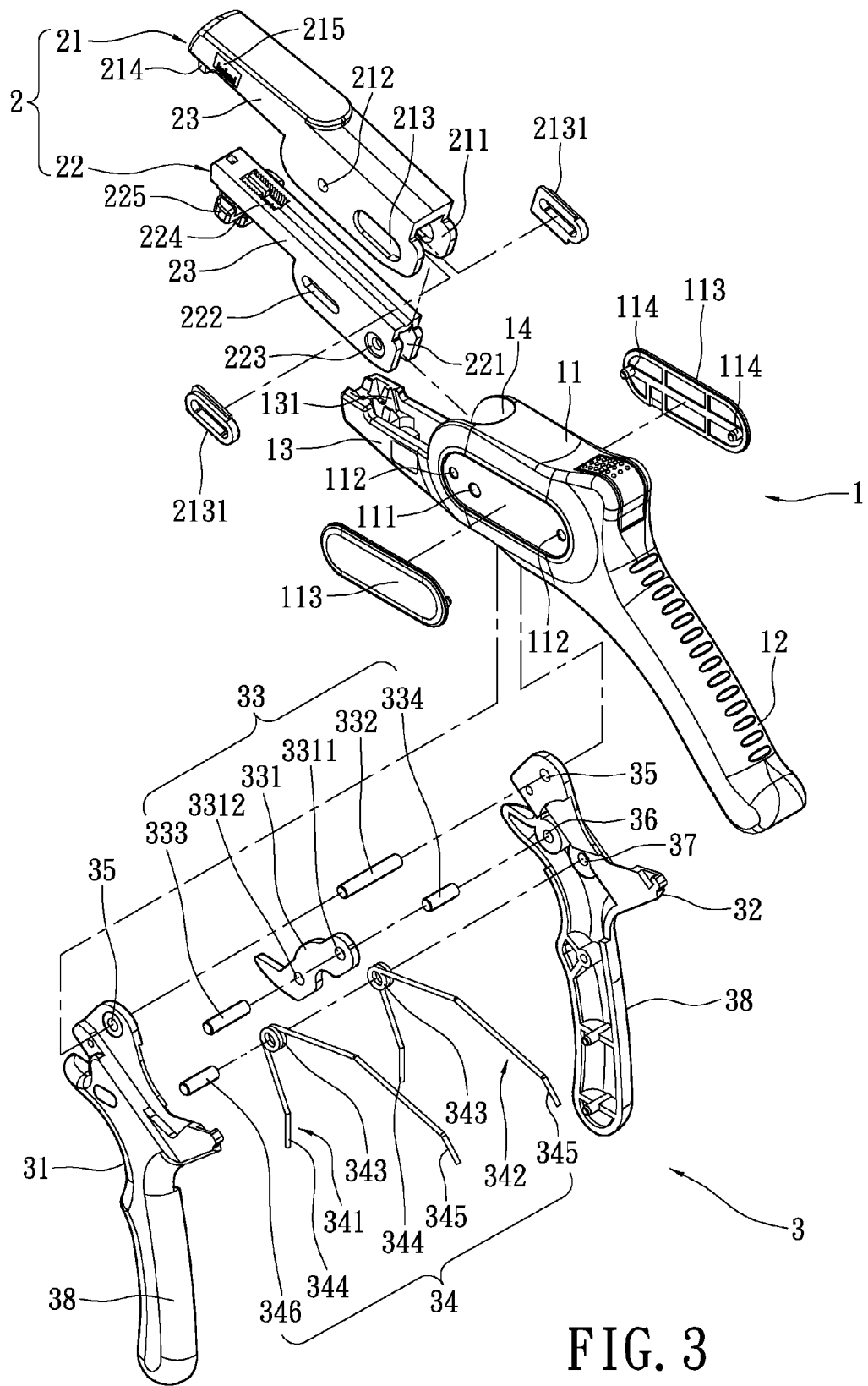
FIG. 3 is an exploded perspective view showing the wire stripper of the present invention.
Figure 4:
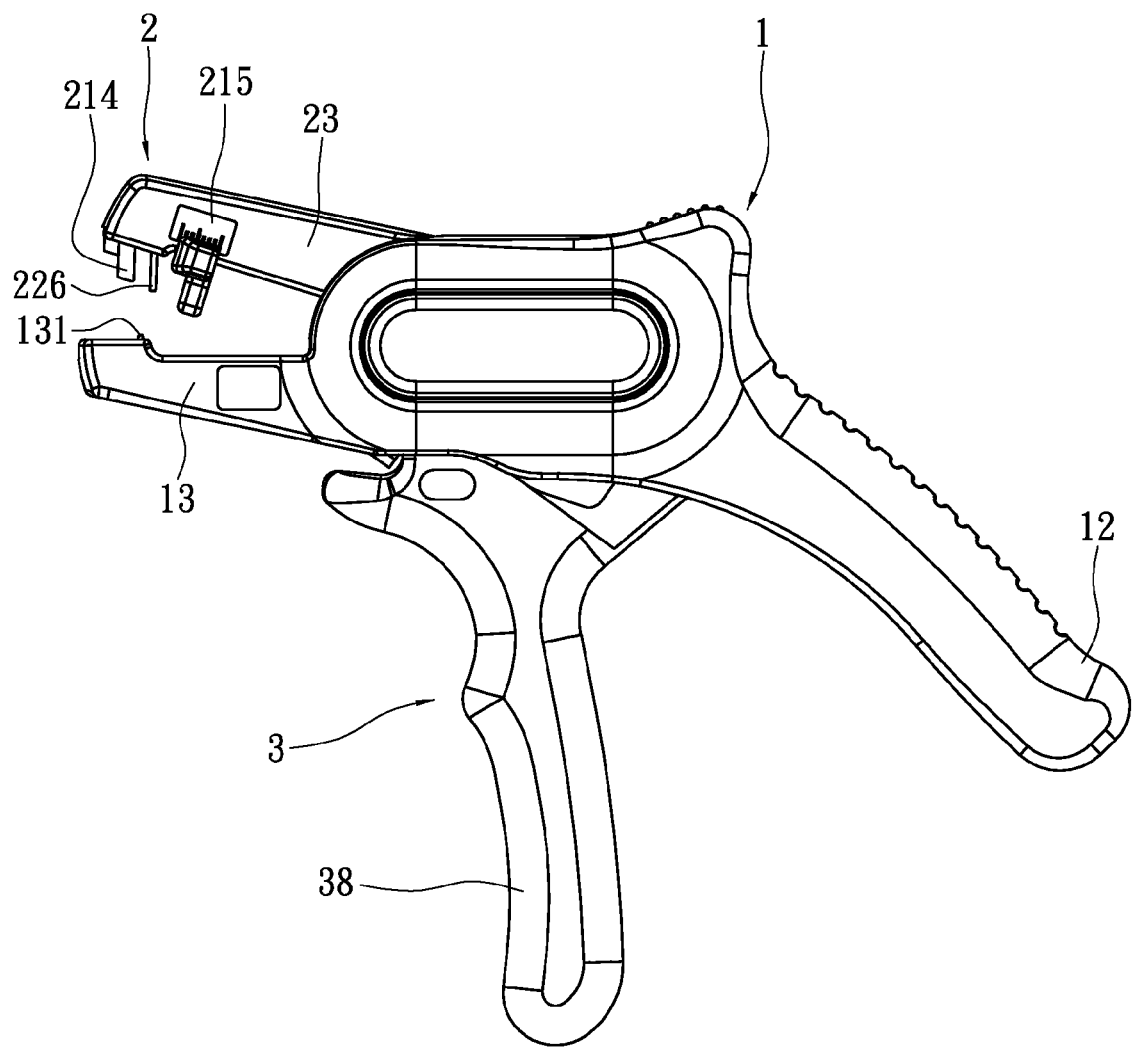
FIG. 4 is a side view showing the wire stripper of the present invention.
Figure 5:
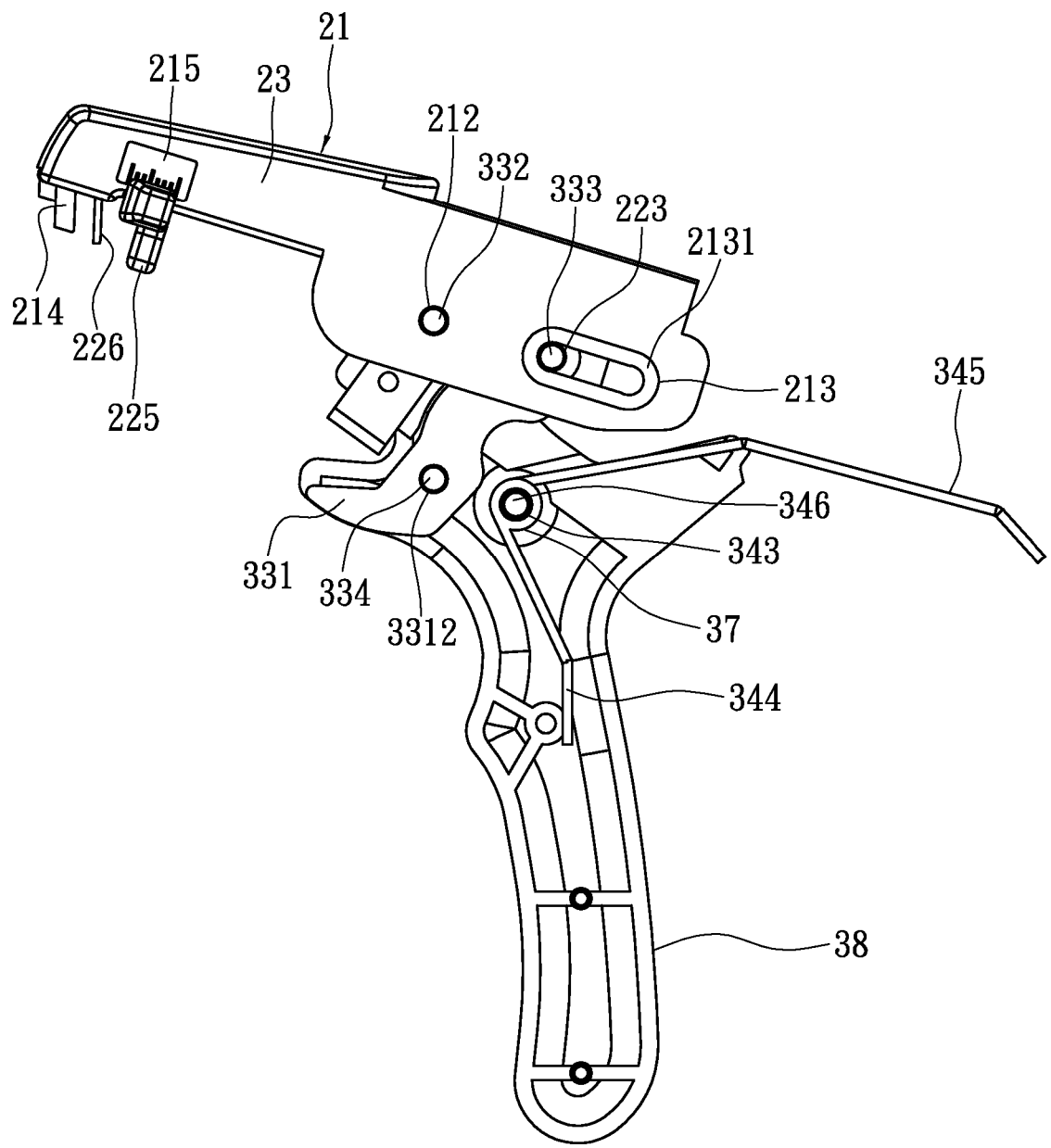
FIGS. 5 and 6 are exploded side views each showing the wire stripper of the present invention.
Figure 6:
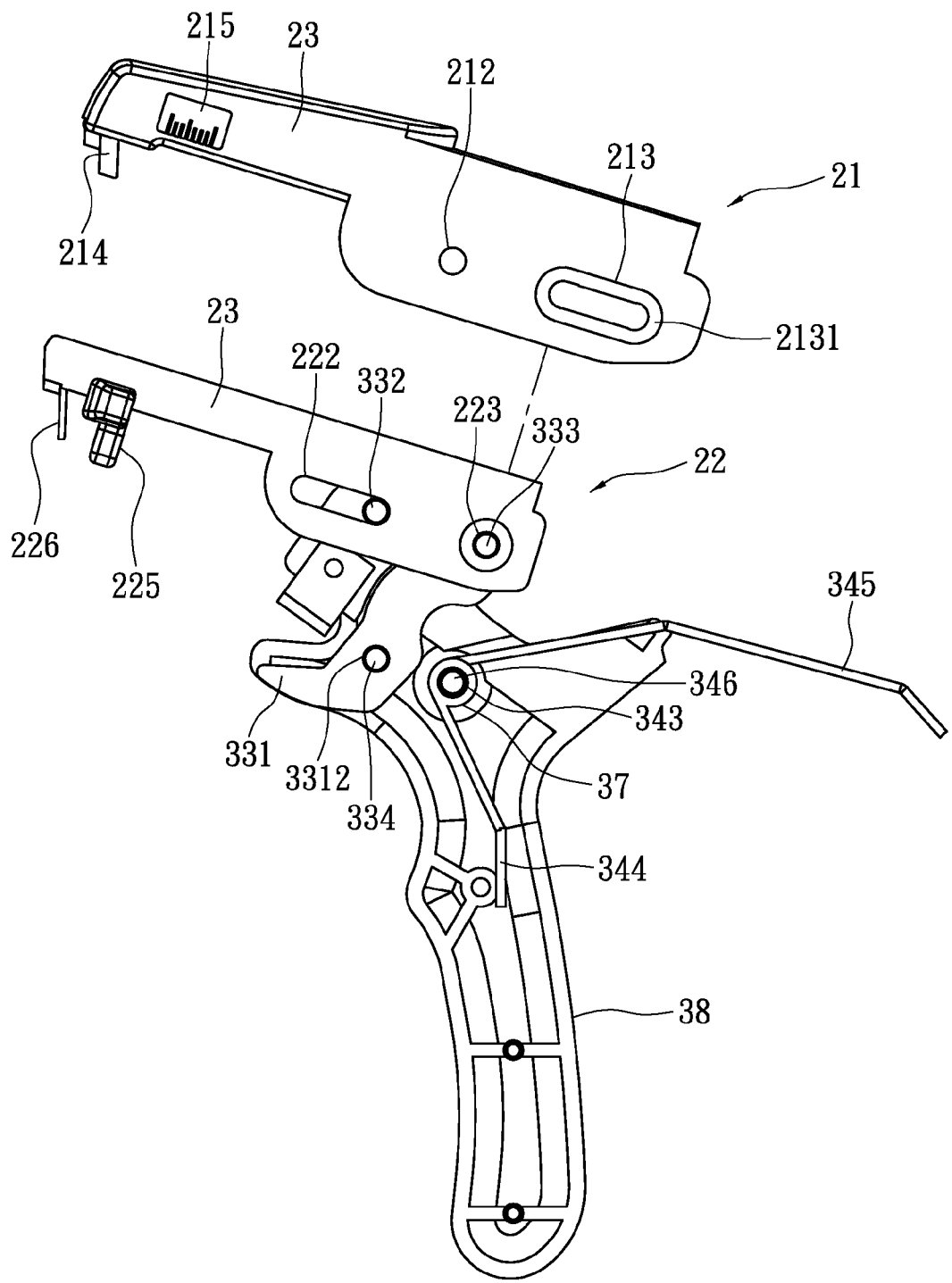

Please refer to FIGS. 2 to 4. The present invention provides a wire stripper, which includes a first main body 1, a second main body 2 and a third main body 3.

Figure 7:
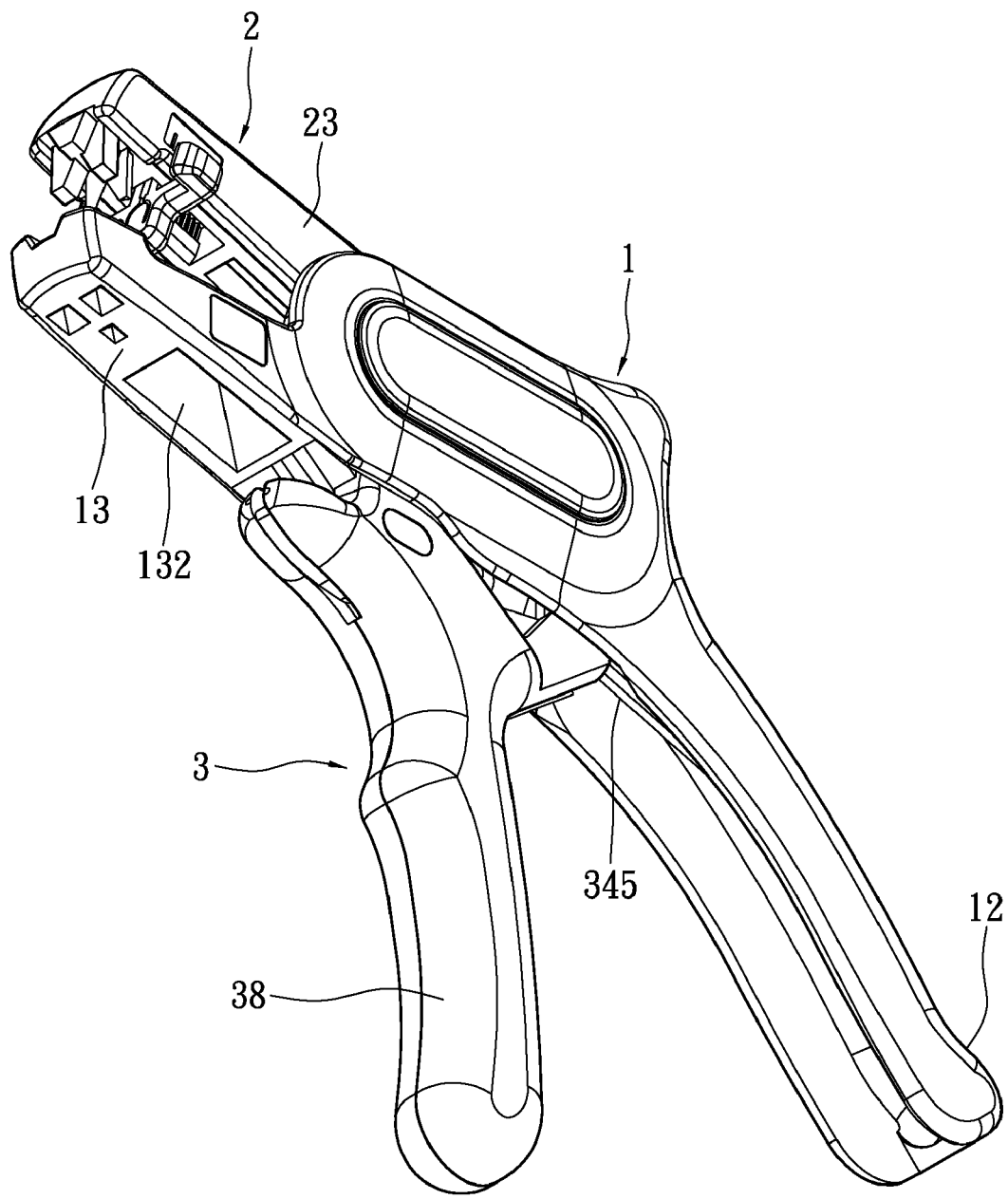
FIG. 7 is a bottom view showing the wire stripper of the present invention.

The first main body 1 has a main body portion 11, a rear grip 12, a lower engaging portion 13 and an accommodating space 14. Both sides of the main body portion 11 have a connecting hole 111 respectively. The connecting hole 111 is made throughout the main body portion 11. The front end and the rear end on both sides of the main body portion 11 have a locking hole 112 respectively. The connecting holes 111 and the locking holes 112 are symmetric with respect to each other in the left-and-right direction. The main body portion 11 further has two side covers 113. The front and rear ends of the inner surface of the side cover 113 have a locking piece 114 respectively. The side cover 113 is connected to the main body portion 11 by means of the locking piece 114 being engaged with the locking holes 112. The rear grip 12 is formed by means of extending rearwards from the rear end of the main body portion 11. The lower engaging portion 13 is formed by means of extending forwards from the front end of the main body portion 11. The lower locking piece 13 has a lower cutter 131 and an exit port 132 (FIG. 7). The V-shaped lower cutter 131 is provided at the front end of the lower engaging portion 13. The exit port 132 is located at the bottom of the lower engaging portion 13. The accommodating space 14 is located within the first main body 1.

Please refer to FIGS. 3 to 6. The second main body 2 includes an outer casing 21 and an inner casing 22. The outer casing 21 has an upper engaging portion 23, an outer trough 211, two first rail holes 212, two second rails 213, a fixing trough 214 and a scale 215. The upper engaging portion 23 is formed by extending forwards from the front end of the outer casing 21. The outer trough 211 is located in the outer casing 21 with its opening downward. The two first rail holes 212 are provided at the front ends on both sides of the outer casing 21. The two second rails 213 penetrate the rear ends on both sides of the outer casing 21. The inner edges of the two second rails 213 are provided with a ring 2131 respectively. The V-shaped fixing trough 214 is located at the bottom of the front end of the upper engaging portion 23 of the outer casing 21. The scale 215 is located on both sides of the front end of the upper engaging portion 23 of the outer casing 21.

The inner casing 22 has an upper engaging portion 23, an inner trough 221, two first rails 222, two second rail holes 223, an adjusting trough 224, an adjuster 225 and an upper cutter 226. The upper engaging portion 23 is formed by extending forwards from the front end of the inner casing 22. The inner trough 221 is located in the inner casing 22 with its opening downward. The two first rails 222 penetrate the front ends on both sides of the inner casing 22. The two second rail holes 223 are provided at the rear ends on both sides of the inner casing 22. The adjusting trough 224 is located on the top of the front end of the upper engaging portion 23. The adjuster 225 is slidably provided in the adjusting trough 224. The V-shaped upper cutter 226 is located at the bottom of the front end of the upper engaging portion 23 of the inner casing 22.

The inner casing 22 is received in the outer trough 211 of the outer casing 21. The first rail hole 221 corresponds to the first rail 222, and the second rail 213 corresponds to the second rail hole 223. The first rail 222 is oriented in the same direction as that of the second rail 213. The inner casing 22 is able to slide in the outer trough 211 with respect to the outer casing 21 in the direction of the first rail 222 and the second rail 213. Both sides of the adjuster 225 are located at the lower edges of the scale 215.

Please refer to FIGS. 3 to 6. The third main body 3 includes a left casing 31, a right casing 32, an acting portion 33 and a spring 34. The left casing 31 and the right casing 32 have two first sliding post holes 35, two acting post holes 36, two spring post holes 37 and two front grips 38. The two first sliding post holes 35 are located at the top of the left casing 31 and the right casing 32. The two acting post holes 36 are located below the two first sliding post holes 35. The two spring post holes 37 are located behind the two acting post holes 36. The two front grips 38 are formed by means of extending downwards from the left casing 31 and the right casing 32. The left casing 31 is combined with the right casing 32.

The acting portion 33 has an acting device 331, a first sliding post 332, a second sliding post 333 and an acting post 334. The first sliding post 332 penetrates the first sliding post holes 35 of the left casing 31 and the right casing 32. The top of the acting device 331 has an upper hole 3311 and its bottom has a lower hole 3312. The second sliding post 333 penetrates the upper hole 3311. The acting post 334 penetrates the lower hole 3312. Both ends of the acting post 334 are located in the acting post holes 36 of the left casing 31 and the right casing 32. The first main body 1, the second main body 2 and the third main body 3 are combined with each other by means of the acting portion 33, the first rails 222, the second rails 213, the first rail holes 212 and the second rail hole 223.

The spring portion 34 has a left spring 341, a right spring 342 and a spring post 346. The left spring 341 and the right spring 342 have a ring portion 343 respectively. The two ring portions 343 extend downwards to form two front extending portions 344, and extend rearwards to form two rear extending portions 345. The spring post 346 penetrates the two ring portions 343. Both ends of the spring post 346 are provided in the spring post holes 37 of the left casing 31 and the right casing 32. The spring portion 34 has at least one spring.

Please refer to FIGS. 2 to 7. The second main body 2 is received in the accommodating space 14 from the front end of the first main body 1. The third main body 3 is received in the accommodating space 14 from the bottom of the first main body 1. The first sliding post holes 35 on the top of the left casing 31 and the right casing 32 as well as the upper hole 3311 on the top of the acting device 331 are received in the inner trough 221 of the inner casing 22. The first sliding post 332 penetrates the connecting holes 111, the first rail holes 212, the first rails 222 and the first sliding post holes 35, thereby connecting the first main body 1, the second main body 2 and the third main body 3. The side covers 113 cover the connecting holes 111 on both sides of the first main body 1. The second sliding post 333 penetrates the second rails 213, the second rail holes 223 and the upper hole 3311 of the acting device 331. The ring 2131 has a wear-proof function. The first main body 1, the second main body 2 and the third main body 3 can move with respect to each other by means of the first sliding post 332 and the second sliding post 333 sliding along the first rail 222 and the second rail 213. The front extending portion 344 of the spring portion 34 abuts the front grip 38, and the rear extending portion 345 abuts the rear grip 12, thereby providing an elastic force.

When the present invention is in use, the upper engaging portion 23 and the lower engaging portion 13 are put into a location to be operated, even in a narrow space, the front end of a wire whose insulating surface is to be stripped off is disposed between the fixing trough 214 of the upper engaging portion 23 and the V-shaped trough of the upper cutter 226. The adjuster 225 is used to set the length to be stripped off and make the front end of the wire to abut the front end of the adjuster 225. The user presses the front grip 38 and the rear grip 12, so that the front grip 38 and the rear grip 12 get closer by using the first sliding post 332 as a center of rotation. The upper engaging portion 23 and the lower engaging portion also get closer to each other. The fixing trough 214 presses the wire between the upper engaging portion 23 and the lower engaging portion 13, thereby preventing the wire from sliding. The insulating surface of the wire is cut off by the upper cutter 226 and the lower cut 131 that are engaged with each other. At this time, in the accommodating space 14, the second main body 2 abuts the inner wall of the top of the main body portion 11. The user further presses the front grip 38 and the rear grip 12 to urge the top of the acting device 331 to rotate toward the rear end of the second rail 213 by using the acting post 334 as a center of rotation. In this way, the second sliding post 333 and the inner casing 22 move rearwards along the second rail 213. The sliding post 332 moves forwards with respect to the first rail 222. At this time, the upper cutter 226 moves rearwards together with the inner casing 22. Thus, the cut-off insulating surface will be stripped off rearwards in a direction parallel to the wire, thereby protecting the integrity of leads within the wire. The stripped insulating surface is exhausted directly by means of the exit port 132 without accumulating therein. When the user stops to press the front grip 38 and the rear grip 12, the elastic force between the front extending portion 344 and the rear extending portion 345 of the spring portion 34 will push the front grip 38 and the rear grip 12 to return to their original positions. The inner casing 22 and the outer casing 21 also return their original positions along the first rails 222 and the second rails 213. The upper engaging portion 23 and the lower engaging portion 13 are separated from each other at this time, so that the leads within the wire can be protected from suffering damage after the insulating surface is stripped off.

The above-mentioned descriptions represent merely the preferred embodiments of the present invention, without any intention to limit the scope of the present invention thereto. Various equivalent changes, alternations or modifications based on the claims of present invention are all consequently viewed as being embraced by the scope of the present invention.

What is claimed is:

1. A wire stripper, comprising: a first main body having a main body portion, a rear grip, a lower engaging portion and an accommodating space, the rear grip being formed by extending from a rear end of the main body portion, the lower engaging portion being formed by extending from a front end of the main body portion, the accommodating space being located in the first main body; a second main body having an outer casing, an inner casing, two upper engaging portions, two first rails, two second rails, two first rail holes and two second rail holes, the inner casing being received in the outer casing, the two upper engaging portions being located at the front ends of the inner casing and the outer casing respectively, the two first rail holes being located at front ends on both sides of the outer casing, the two second rails being located at rear ends on both sides of the outer casing, a ring being disposed in an inner edge of each of the two second rails, the two first rails being located at front ends on both sides of the inner casing, the two second rail holes being located at rear ends on both sides of the inner casing; and a third main body having a right casing, a left casing, an acting portion and a spring portion, the left casing being combined with the right casing, each of the left casing and the right casing having a front grip, the two front grips being formed by extending downwards from the left casing and the right casing respectively, the first main body, the second main body and the third main body being connected with each other by means of the acting portion, the first rails, the second rails, the first rail holes and the second rail holes, the spring portion abutting in the front grip and the rear grip, the second main body and the third main body being mounted in the accommodating space of the first main body.

2. The wire stripper according to claim 1, wherein both sides of the main body portion have a connecting hole respectively, the left casing and the right casing have two first sliding post holes, two acting post holes and two spring post holes, the two first sliding post holes are located at the top of the left casing and the right casing, the two acting post holes are located below the two first sliding post holes respectively, the two spring post holes are located behind the two acting post holes.

3. The wire stripper according to claim 2, wherein the acting portion has a first sliding post, an acting device, a second sliding post and an acting post, the first sliding post penetrates the connecting holes, the first rail holes, the first rails and the first sliding post holes, the top of the acting device has an upper hole and its bottom has a lower hole, the second sliding post penetrates the second rails, the second rail holes and the upper hole, the acting post penetrates the lower hole, both ends of the acting post are disposed in the acting post holes.

4. The wire stripper according to claim 3, wherein the spring portion has at least one spring and a spring post, the spring has a ring portion, the ring portion extends downwards to form a front extending portion and extends rearwards to form a rear extending portion, the front extending portion abuts in at least one of the front grips, the rear extending portion abuts in the rear grip, the spring post penetrates the ring portion of the spring, both ends of the spring post are disposed in the spring post holes.

5. The wire stripper according to claim 1, wherein the first main body has a lower cutter, the lower cutter is disposed at the front end of the lower engaging portion.

6. The wire stripper according to claim 1, wherein the first main body has an exit port located at the bottom of the lower engaging portion.

7. The wire stripper according to claim 1, wherein the interior of the outer casing has an outer trough, the inner casing is received in the outer trough, the interior of the inner casing has an inner trough, the tops of the left casing, the right casing and the acting portion are received in the inner trough.

8. The wire stripper according to claim 1, wherein the outer casing has a fixing trough, the fixing trough is located at the front end of the upper engaging portion.

9. The wire stripper according to claim 1, wherein the outer casing has a scale located on both sides of the front end of the upper engaging portion of the outer casing, the inner casing has an adjusting trough and an adjuster, the adjusting trough is located at the front end of the upper engaging portion of the inner casing, the adjuster is engaged in the adjusting trough, both sides of the adjuster are located at the lower edge of the scale.

10. The wire stripper according to claim 1, wherein the inner casing has an upper cutter located at the front end of the upper engaging portion of the inner casing.

* * * * *